J. Holdcraft,
Gage Cock,
Nº 53,079. Patented Mar. 6, 1866.
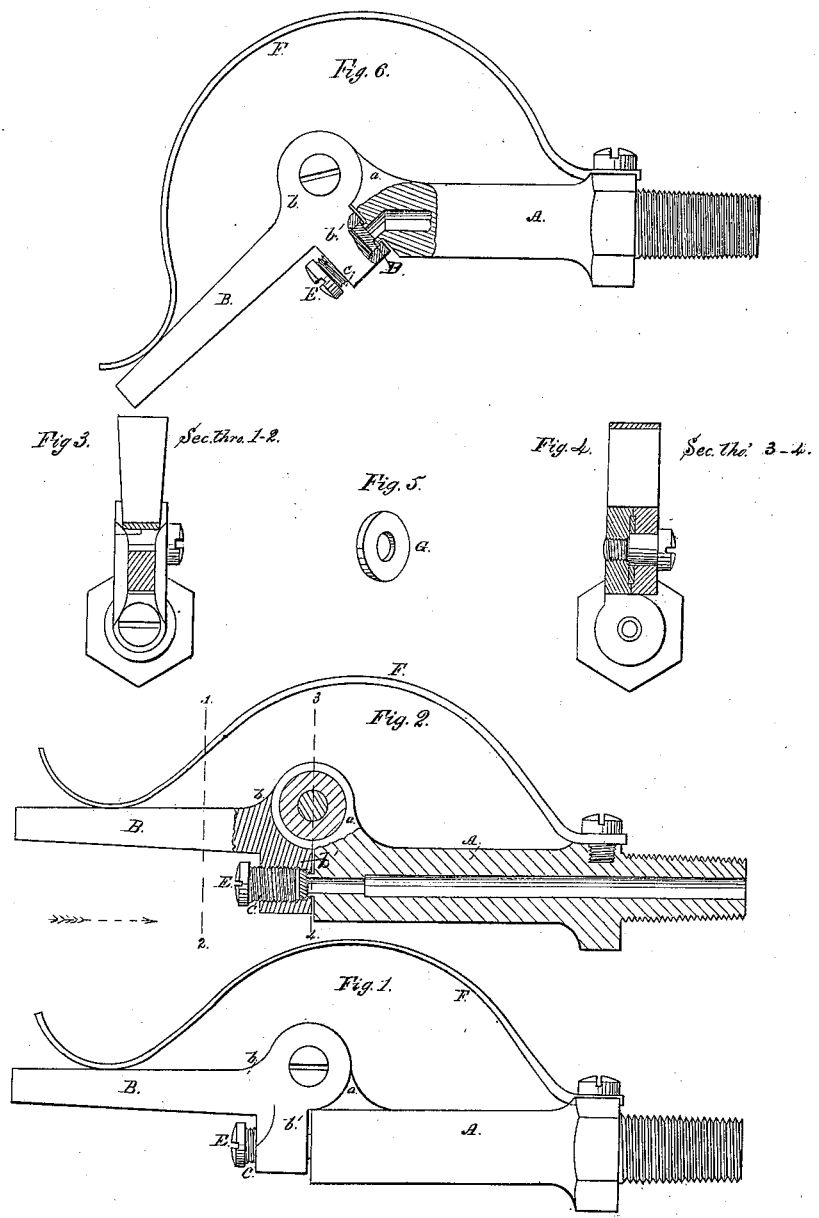
Witnesses
J. E. Shaw
Chas. B. Colfenstein
Inventor:
James Holdcraft

UNITED STATES PATENT OFFICE.

JAMES HOLDCRAFT, OF PHILADELPHIA, PENNSYLVANIA, ASSIGNOR TO HIMSELF AND WILLIAM HOLDCRAFT, OF SAME PLACE.

IMPROVEMENT IN GAGE-COCKS FOR STEAM-BOILERS.

Specification forming part of Letters Patent No. 53,079, dated March 6, 1866.

*To all whom it may concern:*

Be it known that I, JAMES HOLDCRAFT, of the city of Philadelphia and State of Pennsylvania, have invented a new and Improved Gage-Cock for Steam-Boilers; and I do hereby declare that the following is a full, clear, and exact description of the construction and operation of the same, reference being had to the annexed drawings, making a part of this specification, in which—

Figure 1 is a side elevation. Fig. 2 is a vertical longitudinal section; Fig. 3, a transverse section on the line 1 2 in Fig. 2; Fig. 4, a similar section on the line 3 4 of Fig. 2; Fig. 5, a view of the washer employed. Fig. 6 is a side elevation of a modified form of my improvement.

The plug-cock in general use is liable to be rapidly worn out by the friction between the plug and socket, the plug becoming loose and the cock getting leaky.

In the drawings, A, Fig. 2, is a tube to be screwed into the boiler or other vessel, and is provided with a projection, $a$.

B is a lever provided with a projection, $b$, and an offset, $b'$, having an orifice, C, into which is inserted a piece of an elastic or yielding substance, as gum or india-rubber, D. The gum is held in place by a screw, E, which presses it against shoulders of the offset $b'$, as shown. The tube A and the lever B are connected by a washer-joint formed by placing a metallic washer, G, between the projections $a$ and $b$, and securing the whole together by a pivot or set-screw. Projections $a$ and $b$ are recessed on the faces intended to come in contact, the recess in each being in depth equal to one-half the thickness of the washer G.

F is a spring applied in the manner shown. The pressure produced by this spring holds the gum D against the orifice of the tube A and effectually prevents the passage of steam or liquid.

This improved cock is more especially designed to be used as a try-cock for steam-boilers; but it may be substituted with advantage for any ordinary tap.

A washer employed in the manner described diminishes the friction, and can be applied with advantage in all cases where flexible joints are formed by two abutting links.

Having thus described my invention, what I claim, and desire to secure by Letters Patent, is—

The employment of a washer, G, in connection with flexible joints, in the manner and for the purpose substantially as described.

JAMES HOLDCRAFT.

Witnesses:
 J. E. SHAW,
 CHAS. B. HELFENSTEIN.